(12) United States Patent
Hallamaa et al.

(10) Patent No.: US 8,073,960 B2
(45) Date of Patent: Dec. 6, 2011

(54) ARRANGING MANAGEMENT OPERATIONS IN MANAGEMENT SYSTEM

(75) Inventors: Mika Hallamaa, Tampere (FI); Mikko Sahinoja, Tampere (FI); Eero Kaappa, Tampere (FI)

(73) Assignee: Nokia Corporation, Espoo (FI)

( * ) Notice: Subject to any disclaimer, the term of this patent is extended or adjusted under 35 U.S.C. 154(b) by 1275 days.

(21) Appl. No.: 10/966,503

(22) Filed: Oct. 15, 2004

(65) Prior Publication Data
US 2006/0020947 A1 Jan. 26, 2006

Related U.S. Application Data

(60) Provisional application No. 60/585,175, filed on Jul. 1, 2004.

(51) Int. Cl.
*G06F 15/16* (2006.01)
*G06F 15/173* (2006.01)
(52) U.S. Cl. ......................... 709/229; 709/223; 709/228
(58) Field of Classification Search .......... 709/223–227, 709/229
See application file for complete search history.

(56) References Cited

U.S. PATENT DOCUMENTS

| | | | |
|---|---|---|---|
| 5,771,381 A * | 6/1998 | Jones et al. .................... 713/100 |
| 5,960,214 A | 9/1999 | Sharpe, Jr. et al. |
| 6,104,868 A | 8/2000 | Peters et al. |
| 6,262,726 B1 * | 7/2001 | Stedman et al. ............... 715/745 |
| 6,266,694 B1 | 7/2001 | Duguay et al. |
| 6,363,421 B2 | 3/2002 | Barker et al. |
| 6,426,959 B1 | 7/2002 | Jacobson et al. |
| 6,512,526 B1 * | 1/2003 | McGlothlin et al. ........... 715/762 |
| 6,571,245 B2 * | 5/2003 | Huang et al. .................... 707/10 |
| 6,721,881 B1 * | 4/2004 | Bian et al. ......................... 713/1 |
| 6,728,750 B1 * | 4/2004 | Anderson et al. ............. 709/201 |
| 6,879,982 B2 | 4/2005 | Shirasaka |
| 7,024,471 B2 * | 4/2006 | George et al. .................. 709/222 |
| 7,039,858 B2 * | 5/2006 | Humpleman et al. ......... 715/205 |
| 7,051,101 B1 | 5/2006 | Dubrovsky et al. |
| 7,155,521 B2 | 12/2006 | Lahti et al. |
| 7,530,024 B2 * | 5/2009 | Takahashi et al. ............. 715/763 |
| 7,716,276 B1 | 5/2010 | Ren et al. |
| 2002/0013855 A1 | 1/2002 | Ishii et al. |
| 2003/0046381 A1 | 3/2003 | Mokuya et al. |
| 2003/0078959 A1 | 4/2003 | Yeung et al. |
| 2003/0172046 A1 | 9/2003 | Scott |

(Continued)

FOREIGN PATENT DOCUMENTS
EP 1 515 571 A2 3/2005

OTHER PUBLICATIONS

OMA Device Management Working Group, "State Machine and Primitives for Service Life Cycle Management", May 17, 2004.

(Continued)

*Primary Examiner* — Hussein A. Elchanti
(74) *Attorney, Agent, or Firm* — Hollingsworth & Funk, LLC

(57) ABSTRACT

The invention relates to a method for arranging local operations in a management system, the method comprising: defining a management command addressed to a first node in a management structure of the managed device such that it comprises a command for performing a local operation for a second node of the management structure in the managed device, transmitting the management command to the managed device, defining at least one required local operation on the basis of the received management command, and initiating the defined local operation.

36 Claims, 4 Drawing Sheets

U.S. PATENT DOCUMENTS

| | | |
|---|---|---|
| 2003/0204612 A1 | 10/2003 | Warren |
| 2003/0204640 A1 | 10/2003 | Sahinoja et al. |
| 2004/0083472 A1 | 4/2004 | Rao et al. |
| 2004/0103214 A1 | 5/2004 | Adwankar et al. |
| 2004/0111315 A1 | 6/2004 | Sharma et al. |
| 2004/0127196 A1 | 7/2004 | Dabbish et al. |
| 2004/0139240 A1 | 7/2004 | DiCorpo et al. |
| 2004/0205333 A1 | 10/2004 | Bjorkengren |
| 2005/0015477 A1 | 1/2005 | Chen |
| 2005/0039178 A1 | 2/2005 | Marolia et al. |
| 2005/0060507 A1 | 3/2005 | Kasako et al. |
| 2005/0228847 A1 | 10/2005 | Hayes, Jr. |
| 2005/0232175 A1 | 10/2005 | Draluk et al. |
| 2005/0272455 A1 | 12/2005 | Oommen |
| 2006/0010232 A1 | 1/2006 | Page et al. |
| 2008/0025239 A1 | 1/2008 | Bossoli et al. |

OTHER PUBLICATIONS

OMA Device Management Working Group, "Service Life Cycle Management", Apr. 19, 2004.

Open Mobile Alliance, "SyncML Device Management Tree and Description", Version 1.1.2, Jun. 12, 2003.

Open Mobile Alliance, "SyncML Representation Protocol Device Management Usage", Version 1.1.2, Jun. 12, 2003.

Open Mobile Alliance, "SyncML Device Management Protocol", Version 12, Jun. 12, 2003.

U.S. Appl. No. 10/966,745, filed Oct. 15, 2004, Hallamaa et al.

U.S. Appl. No. 10/966,747, filed Oct. 15, 2004, Hallamaa et al.

Open Mobile Alliance: "SyncML Device Management Protocol", Version 1.1.2, Dec. 12, 2003, pp. 1-41.

Office Action from U.S. Appl. No. 10/966,745 dated Mar. 31, 2008, 18 pages.

Office Action from U.S. Appl. No. 10/966,745 dated Jan. 7, 2009, 24 pages.

Office Action from U.S. Appl. No. 10/966,745 dated Sep. 16, 2009, 25 pages.

Office Action Response from U.S. Appl. No. 10/966,745 dated Sep. 30, 2008, 16 pages.

Office Action Response from U.S. Appl. No. 10/966,745 dated Jul. 7, 2009, 24 pages.

Office Action Response from U.S. Appl. No. 10/966,745 dated Feb. 16, 2010, 16 pages.

Office Action from U.S. Appl. No. 10/966,747 dated Mar. 12, 2010, 20 pages.

Office Action from U.S. Appl. No. 10/966,745 dated Jul. 26, 2010, 14 pages.

Office Action Response from U.S. Appl. No. 10/966,745 dated Oct. 14, 2010, 13 pages.

Office Action Response from U.S. Appl. No. 10/966,747 dated Jun. 14, 2010, 14 pages.

Office Action from U.S. Appl. No. 10/966,747 dated Aug. 30, 2010, 17 pages.

Office Action Response from U.S. Appl. No. 10/966,747 dated Oct. 25, 2010, 11 pages.

Office Action from U.S. Appl. No. 10/966,745 dated Aug. 29, 2011, 17 pages.

Office Action from U.S. Appl. No. 10/966,747 dated Sep. 19, 2011, 20 pages.

* cited by examiner

ARRANGING MANAGEMENT OPERATIONS IN MANAGEMENT SYSTEM

RELATED APPLICATIONS

This application claims the benefit of the U.S. Provisional Application No. 60/585,175, filed Jul. 1, 2004, the content of which is incorporated by reference in its entirety.

FIELD OF THE INVENTION

The invention relates to arranging management operations in a management system.

BACKGROUND OF THE INVENTION

As different data processing devices, such as mobile stations, become more complex, the significance of device management becomes more pronounced. Devices require several different settings, such as settings related to Internet access points, and setting them manually by the user is arduous and difficult. To solve this problem, for instance, device management solutions have been developed so that the administrator of a company's information system or a teleoperator can set an appropriate configuration for a device Device management generally refers to actions by which a person typically not using a device can change the configuration of the device; for instance change the settings or even a protocol used by the device. In addition to device-specific settings, it is also possible to transmit user-specific data, such as user profiles, logos, ringing tones, and menus with which the user can personally modify the settings of the device, or the modification takes place automatically in connection with device management.

One of the device management standards is OMA (Open Mobile Alliance) DM (Device management), which is partly based on the SyncML (Synchronization Markup Language) protocol. For instance, a personal computer (PC) can act as a device management server in a device management protocol and a mobile station as a device management client. In terms of device management, the device management client, possibly on the basis of a triggering message from the device management server, transmits information concerning itself in a session initiation message to the device management server, and the device management server replies by transmitting its own information and server management command. The device management client replies to this command with status information, after which the server can end the session or transmit more server management commands. If the server transmits more server management commands, the client is to reply to them with status information. The server can always, after receiving status information, end the session or continue it by transmitting more server management commands. Device management can also be implemented by first transmitting queries to the user about what (s)he wishes to update, and information on the user's selections is transmitted to the server. Next, the server can in the next packet transmit the updates/commands the user desires.

The items managed in the device management client are arranged as device management objects. The device management objects are entities that can be managed by server management commands in the device management client. The device management object can for instance be a number or a large entity, such as background image or screensaver. At least some of the device management objects can be standardized; the OMA DM device management standards include three standardized management objects at the moment.

In OMA device management, device management objects are arranged in a management tree, which is illustrated in FIG. 1. The management tree is made up of nodes and defines at least one device management object formed of one or more nodes or at least one parameter of a node. The following examines nodes that form the device management objects. The node can be an individual parameter, a sub-tree or a data collection. For instance, a "Vendor" node is an interior node, because it has child objects, "ScreenSaver" and "Ringing-Tones". "ScreenSaver" is a leaf node, because it does not have child objects. "RingingTones" is also an interior node, because it has child objects. A node may comprise at least one parameter that may be a configuration value or a file, such as a background image file in the node "ScreenSaver". The content of the node can also be a link to another node. Each node can be addressed by a uniform resource identifier (URI). URI of a node is formed starting from the root "/", and when proceeding along the tree, each node has a name that is added to the earlier ones using "/" as the separator. For instance, the node "RingingTones" can be addressed by URI "Nendor/RingingTones/". The nodes can be fixed or dynamic. The device management client or server can add dynamic nodes to the management tree by device management command "ADD".

Current device management systems enable manipulation of application and device specific configuration parameters, i.e. configuration management. However, a need exists for more versatile management systems.

BRIEF DESCRIPTION OF THE INVENTION

A method, data processing devices, computer programs, and data storage mediums are provided, which are characterized by what is stated in the independent claims. Some embodiments of the invention are described in the dependent claims.

According to an aspect of the invention, a managing device is configured to define at least one management command addressed to a first node of a management structure of a managed device such that the management command comprises a command for arranging a local operation for a second node of the management structure of the managed device or at least an indication of the second node to which the local operation is to be carried out in the managed device. The managed device is configured to define at least one required local operation to a second node of a management structure on the basis of a received management command to a first node of the management structure. Further, the managed device is configured to initiate the defined local operation to the second node in the management structure. The term node is to be understood generally to refer to any kind of storage position of a management structure, and is thus not limited to nodes of OMA device management trees.

The present invention makes it possible to arrange local management operations in a management system. Thus the managed device may control the management of the second node. For instance, the managed device may only be allowed to modify the second node, but the second node may be modified on the basis of a triggering management command from a managing device. The second node may be managed indirectly and the second node may reside anywhere in the management structure, such as a management tree. Another advantage is that commands may be centralized to the first node. This enables the managing device to instantly define what kind of command-based management is possible.

BRIEF DESCRIPTION OF THE FIGURES

The invention is now described in greater detail by means of some embodiments and with reference to the attached drawings, in which.

DETAILED DESCRIPTION OF THE INVENTION

One embodiment of the invention will be described in the following in a system supporting OMA device management; it should, however, be noted that the invention can be applied to any device management system, in which device management objects can also be organized in structures other than tree structure.

Figure 1:
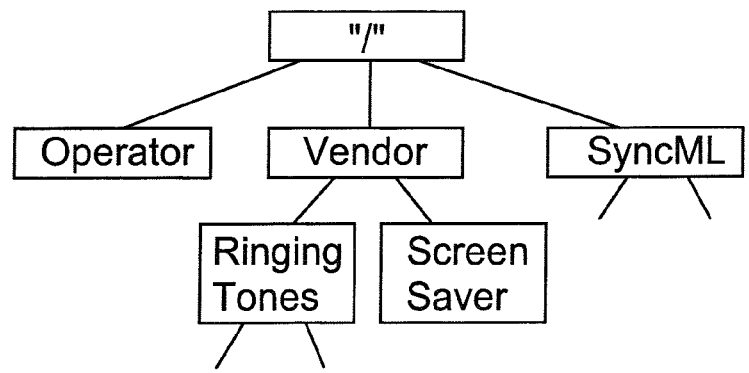
FIG. 1 illustrates a management tree.
Figure 2:
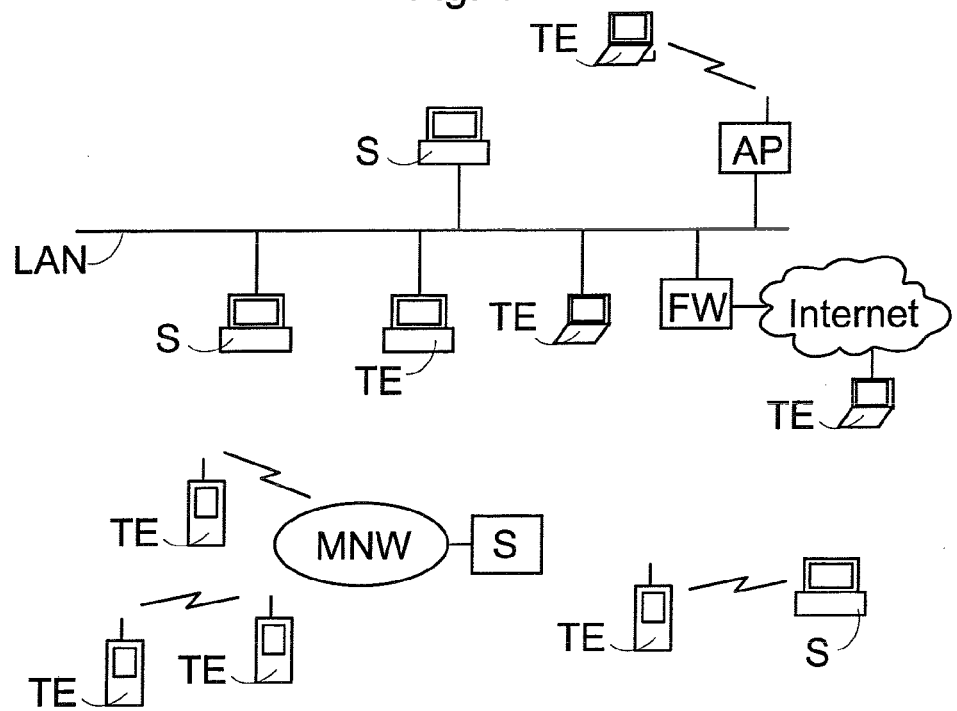
FIG. 2 illustrates networking scenarios in which the present service management system could be applied.

FIG. 2 illustrates a networked system. A network server or a PC typically serves as the server S. A mobile station, PC, laptop computer, or PDA (Personal Digital Assistant) device typically serves as the terminal TE. In the following embodiments, it is assumed that for device management, the terminal TE serves as the device management client and the server S as the device management server. The server S can manage several clients TE.

FIG. 2 shows two examples, in the first of which clients TE and management servers S are connected to a local area network LAN. A client TE connected to the network LAN comprises a functionality, such as a network card and software controlling data transmission, for communicating with the devices in the network LAN. The local area network LAN can be any kind of local area network and TE can also be connected to the server S through the Internet typically using a firewall FW. The terminal TE can also be connected to the local area network LAN wirelessly through an access point AP.

In the second example, the client TE communicates with the server S through a mobile network MNW. A terminal TE connected to the network MNW comprises a mobile station functionality for communicating wirelessly with the network MNW. There may also be other networks, such as a local area network LAN, between the mobile network MNW and server S. The mobile network MNW can be any known wireless network, for instance a network supporting. GSM services, a network supporting GPRS (General Packet Radio Service) services, a third-generation mobile network, such as a network according to the network specifications of 3GPP ($3^{rd}$ Generation Partnership Project), a wireless local area network WLAN, a private network, or a combination of several networks. One important service of the transport layer in many mobile networks is WAP which comprises a WSP (Wireless Session Protocol) layer with which a transport service can be provided for a device management application layer in a client TE and server S. The system then comprises at least one WAP gateway and possibly one or more WAP proxies. Other protocols can also be used for transporting device management messages. Another important transport technology that may be utilized is the HTTP (Hyper Text Transfer Protocol). The lower-layer transport techniques can be circuit- or packet-switched in accordance with the properties of the underlying mobile network MNW. In addition to the earlier examples, many other device management configurations are also possible, such as a management connection between terminals TE or a direct management connection between the terminal TE and server S by using a wireless or a wired connection without any other network elements.

Figure 3:
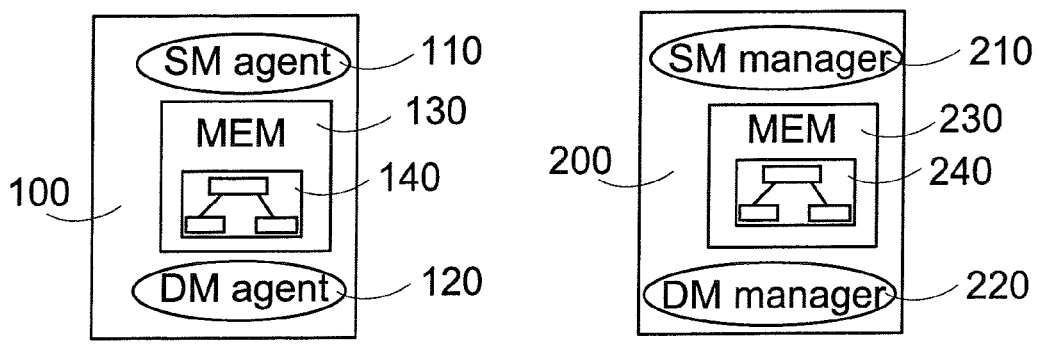
FIG. 3 illustrates data processing devices according to an embodiment of the invention.

FIG. 3 illustrates functional entities of a data processing device 100 functioning as a managed client device in view of service management and a data processing device 200 functioning as a server in view of service management. For instance, referring to FIG. 2, terminal TE could be the client device 100 and the server S could be the server device 200. The data processing device 100 comprises a service management agent 110 (which may also be referred to as a service management client) for monitoring and/or performing service management level operations. The service management level operations may be performed by executing service management commands originally defined by a service management (SM) manager 210. The SM manager (which may also be referred to as an SM server) 210 defines SM commands and may in one embodiment map SM commands to device management (DM) commands on the basis of mapping instructions which may be stored in a memory 230. A suitable transport protocol, such as HTTP may be used for the DM level communication.

A management tree 140 is stored in the memory 130 of the data processing device 100, and information and/or device description thereof (240) is also stored in the memory 230 of the data processing device 200. In the present embodiment OMA device management capabilities are used in the service management system. The data processing device 100 serving as an OMA device management client comprises a DM (client) agent 120 that takes care of functions related to the device management session in the client. DM (client) agent 120 may execute device management commands from the device management server 220 for management objects in the management tree 140, deliver the DM commands to the SM agent 110, and/or perform the mapping between received DM commands and SM commands. The data processing device 200 serving as a device management server comprises a DM manager or a DM server 220 managing the OMA DM management session which may in one embodiment perform mapping of SM commands from SM server 210 to DM commands. It is to be noted that the entities of FIG. 3 are only exemplary and a single entity or more than two entities may implement the functions of agents 110 and 120, for instance.

The management structure comprising managed objects can be any structure containing manageable items, without being limited to the device management trees of OMA device management. Service management refers generally to any capability to manage one or more applications in a manageable device and the term command refers to any management command or primitive on the basis of which the management action can be effected.

Mapping instructions for arranging mapping between service management commands and device management commands are stored in the data processing device 200. The SM manager 210 may be configured to establish a device management command or primitive on the basis of a received service management command and the mapping instructions. In an embodiment mapping instructions for defining service management commands for received device management commands are stored in the memory 130 of the device 100 comprising the SM agent 110 functionality. By this embodiment it is possible to convert received DM commands to SM commands (which are to be understood broadly to include also primitives or SM operations in some other form), which may then be carried out by the SM agent 110. In another embodiment an SM command is defined in the client device 100 on the basis of or in response to the execution of one or more. DM commands.

It is to be noted that the mapping instructions may be directly implemented in the control logic of the SM manager 210 (or another entity performing the mapping between SM and DM commands, for instance the DM manager 220), whereby no separate mapping instructions file for mapping needs to be stored but the mapping instructions 250 may be stored within the program code controlling the processor of the device (200), for instance.

The (client) data processing device 100 may further comprise a separate management tree module for modifying the management tree (140) on the basis of the DM commands from the DM agent (120) and the SM commands from the SM agent (110). The (client) data processing device 100 may also comprise information on dependencies between manageable objects.

The data processing devices 100, 200 further comprise a transceiver for arranging data transfer and a processing unit comprising one or more processors. Computer program codes executed in the processing unit may be used for causing the data processing devices 100, 200 to implement means for arranging local operations, some embodiments of the inventive functions also being illustrated below in association with FIGS. 4a, 4b, 5, 6 and 7. A chip unit or some other kind of module for controlling the data processing device 100 and/or 200 may in one embodiment cause the device to perform the present inventive functions. The module may form part of the device and could be removable, i.e. it can be inserted into another unit or device. Computer program codes can be received via a network and/or be stored in memory means, for instance on a disk, a CD-ROM disk or other external memory means, where from they can be loaded into the memory of the data processing devices 100, 200. The computer program can also be loaded through a network by using a TCP/IP protocol stack, for instance. Hardware solutions or a combination of hardware and software solutions may also be used to implement the inventive functions. It is to be noted that the manageable objects or control information may be stored in internal memory or external memory (for instance a removable memory card or an IC card) of the data processing device 100 or in an external storage.

Figure 4A:
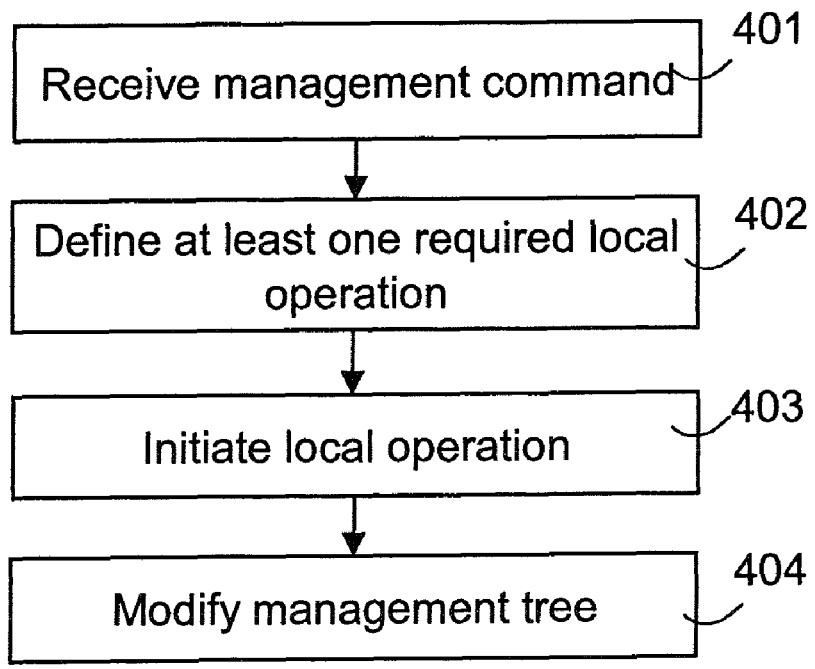
FIGS. 4a and 4b illustrate a method according to an embodiment of the invention.

FIG. 4a illustrates a method of an embodiment, which can be performed in the management client device 100. In step 401, a management command is received from a management server. The method may be applied for service management (SM) and/or device management (DM) commands, i.e. by SM agent 110 and/or DM agent 120. In the present method the management command requires operations in the management tree 140, and at least one local operation is defined on the basis of the received management command in step 402. The local operation is directed on the basis of an identifier in the management command to another node than the node for which the received management command was addressed. The defined local operation is initiated 403. On the basis of the local operation, the management tree 140 is modified. Thus, it is possible to arrange a local operation to a second node in the management tree 140 on the basis of a management command addressed to a first node of the management tree 140.

The managing device 200 may be configured to define a management command such that it comprises a command for performing a local operation in the managed device. This may be arranged by a command targeted to a specific URI in the management tree 140 causing the managed device 100 to carry out a local operation, for instance.

In one embodiment, the service management agent 110 is configured to define the local operation in accordance with a service management command defined from a device management command.

Figure 4B:
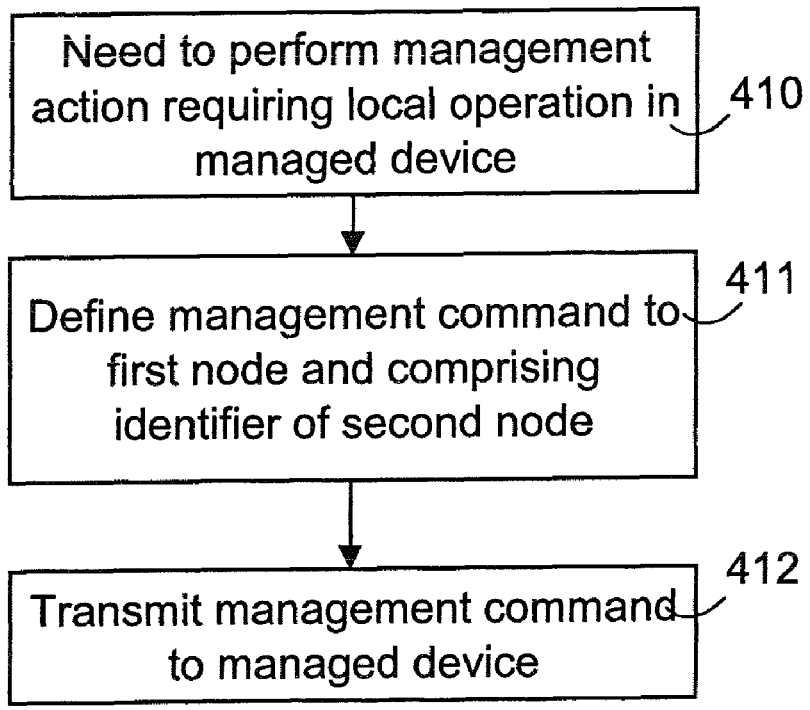

FIG. 4b illustrates a method of an embodiment, which can be performed in the management server device 200. When exists a need 410 to perform a management action requiring a local operation in the managed device, at least one management command addressed or destined to a first node of a management structure of the managed device is defined 411 such that it comprises a command for performing a local operation for a second node of the management structure of the managed device. It is to be noted that the local operation may be indirectly defined by the command, in one embodiment an intermediate device management command is defined in step 411, on the basis of which the actual local operation is defined in the managed device. Thus at least an indication of the second node to which the local operation is to be carried out in the managed device 100 may be defined within an appropriate command in step 411. The message may comprise an identifier of the second node and/or the managed object represented by the second node. It is to be noted that the management command may indirectly identify the second node. For instance an identifier of a managed item may be specified, on the basis of which identifier the second node may then be defined in the managed device. In step 412 a message comprising the management command is transmitted to the managed device (100). In the following some more detailed embodiments related to arrangement of local operations in the managed device are illustrated.

Figure 5:
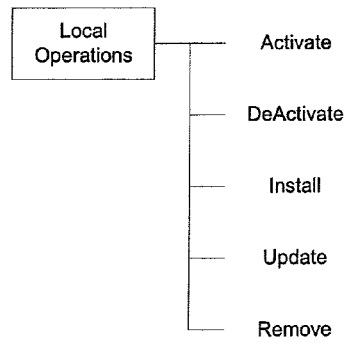
FIG. 5 illustrates a node for local management operations.

As illustrated in FIG. 5, a specific node may be defined in the management tree 140 for local operations. As illustrated in the example of FIG. 5, a sub-node may be stored for each local operation. In response to an execution command to such sub-node, an operation associated with the sub-node is carried out and as a result one or more other nodes in the management tree 140 may be modified.

In one embodiment the DM command is defined in the managed server device 100 such that the DM agent 120 performs the execution command to a local operation sub-node. On the basis of this execution command, the SM agent 110 is configured to carry out the actual (SM level) local operation and modify the management tree 140 as appropriate. For instance, a sub-node is arranged for an activation operation ("Activate"). In response to execution command to this sub-node, at least one node comprising an SM level deployment component or another manageable object is set to active state. Other exemplary local operations shown in FIG. 5 are "Deactivate" for deactivating an object or a component, "Install" for installing an object or a component, "Update" for updating an object or a component, and "Remove" for removing an object or a component.

An execution command to a local operations node may comprise parameter data. The parameter data may comprise any parameters specifying the local operation. In the following an example is given in which information on a deployment component, for which the local operation is to be directed, may be specified in the parameter data. The parameter data may comprise a URI or other information of the second node for which the local operation is targeted. In an embodiment a sub-node or a sub-tree for parameters may be added by ADD command(s). The parameter data may be delivered to the local operations node in an execution command to the local operations node. An entity carrying out the local operation is configured to carry out the required local operation on the basis of the parameter data in the execution command.

In one embodiment the use of the local operations node may be arranged such that a local command and parameter data specifying the local command is submitted directly to the node. The local operation is then executed directly on the basis of the command. Thus the node may be a general-purpose local operations node to which commands directed to other nodes of the management tree may be addressed. By this embodiment there is no need to have specific nodes for each different local operation.

In the following an exemplary SM level command and a derived DM level command for a local operation is described:

De-Activate [a]->Exec (De-Activate[a])

The De-Activate is an SM level command for implementing deactivation operation for a managed item or component and, as illustrated by the arrow, is mapped to the DM level execution command directed to a local operation node (De-Activate) on the basis of the mapping instructions. The "Exec" refers to the DM level execution command which is sent by the DM manager 220 to the DM agent 120. On the basis of the specifying portion "De-Activate"the DM agent 120 may then carry out an execution command to the "De-Activate" node (see also the exemplary tree structure illustrated in FIG. 6). As the execution command is issued to the "De-Activate" node, it is noticed (for instance by the SM agent 110) that a local deactivation command needs to be carried out for managed object (for instance for an SM level deployment component illustrated later) "a". The management command may comprise (as parameter data, for instance) a URI to one or more nodes of deployment component "a", or another identifier of the node "a", on the basis of which the appropriate node(s) of the deployment component "a" are specified. Then the local operation is carried out, whereby object "a" is deactivated, in one embodiment deleted from the "Active" node of the management tree 140 illustrated in FIG. 6. The SM agent 110 may request or instruct the DM agent 120 to carry out the required modification to the management tree 140 for the appropriate node(s) of the "a" object. Alternatively the SM agent 110 may comprise means for modifying the management tree 140. For instance, the SM agent 110 may issue a DM command "Delete node [a]" addressed to the "Active"node. It is to be noted that further actions besides step 412 may also be performed. For instance, before modifying the management tree for deactivating a manageable SM level item, running processes are checked and a process related to the item is ended.

It is possible to utilize at least part of the features of the OMA specifications; for a more detailed description of the OMA device management protocol and other commands, for instance, reference is made to the OMA specification "*SyncML Device Management Protocol*", version 1.1.2, 12 Jun. 2003, 41 pages, and the OMA specification "*SyncML Representation Protocol Device Management Usage*", version 1.1.2, 12 Jun. 2003, 39 pages. In chapter 6.5, the latter specification defines the different protocol operation elements with which the DM manager 220 and/or the SM agent 110 may define the DM commands to the management tree 140 of the managed client device 100. The OMA DM specification "*SyncML Device Management Tree and Description*", version 1.1.2, chapter 9.3.4 describes the current management tree related features. In one scenario conventional OMA DM procedures are applied between the DM manager 220 and the DM agent 120 for configuration management, i.e. for setting appropriate configuration parameters and the present SM procedures are applied for management of services, typically for management of entire applications or at least application portions, covering for instance installation and updates instead of merely setting appropriate settings.

The SM level entities (the SM manager 210 and the SM client 110) may be configured to use at least part of the DM layer services, in the present embodiment the OMA DM services, specified in the OMA DM specifications. Besides the already illustrated device management features, the OMA DM security and session management features may be utilized, for instance.

In the following, service management features according to an embodiment are further illustrated, referring also to FIG. 3. At least some of these service management features may be utilized for arranging local operations.

In one embodiment, the service management manager 210 defines one or more DM commands on the basis of an SM level command (when SM has been selected as the management method) and forwards them to the DM manager 220 which communicates the DM command(s) using the DM protocol to the DM agent 120 in the managed device 100. In this embodiment the DM functions are used to serve the transmission of SM level commands. Thus, in protocol layer view, the DM layer is underneath the SM layer and uses transport services of an underlying transport protocol layer such as the HTTP. Alternatively the DM manager entity 220 may be configured to perform the mapping between the SM and DM commands.

In one embodiment, the DM client 120 receives the DM message and defines a corresponding SM command for the received DM command. The DM client 120 may then forward the defined SM command or indicate the required SM command to the service management agent 110. The DM agent 120 may be configured to notify the SM agent 110 on the basis of the one or more received device management commands. The SM agent 110 may then carry out the one or more required service management commands or operations on the basis of the notification from the DM agent 120. The DM agent 120 may notice on the basis of the target node or an area in the management tree 140 identified in the received DM command that an SM command needs to be defined.

The DM agent 120 may perform the DM command to a node controlled by the SM agent 110 in the DM tree 140. In an embodiment the SM agent 110 is configured to detect a modification to the management tree 140 due to execution of one or more device management commands. The SM agent is thus triggered to initiate an action to carry out a SM level management action, see for instance the use of "Local Operations" node illustrated later. For instance, the SM agent 110 may be configured to follow one or more nodes of the management tree 140 and detect an execution command to such node, thereby identifying the required SM command.

The SM agent 110 may be configured to further modify the management tree 140 in accordance with the derived service management command. In a further embodiment, the received device management command comprises a plurality of subtasks and is mapped by the SM agent 110 into a plurality of service management commands.

In an alternative embodiment the DM agent 120 merely delivers the received DM command to the SM agent 110. The SM agent 110 may then define a corresponding SM command for the received DM command and carry out the required action.

The management system is configured to support a number of management commands in order to deliver and manage services, for instance native applications and/or application components. In one embodiment the following SM commands or primitives are supported: service and/or application inventory, delivery, installation, activation/deactivation (not necessary for all services/applications), update, and removal. These commands may be utilized in the above illustrated method features, at least some of them may also be implemented by local commands, but it is to be noted that the scope of the invention is not limited to any particular commands, and any forthcoming command types may also be used. In one embodiment the inventory of existing manageable items is made before any other SM management commands are defined by the SM manager 210.

In an embodiment, the service management system employs deployment components for controlling a part of manageable items controlling a service in the client device 100. In one embodiment at least some of the above illustrated features related to local operations may be used for managing deployment components. The deployment component is an abstraction model especially dedicated for SM level management functions and represents a group of manageable items of an application. This embodiment provides flexibility for service management operations and closely related manageable items may be gathered as a single deployment component.

For instance, a deployment component in the management tree 140 can be an executable, a library, a setting, a resource, a UI-element, a certificate, or a license. A deployment component may be associated with a predetermined number of states. A current state of the deployment component may be changed by atomic state transfer primitives. The deployment component may be an independent file, a .SIS file, a .CAB file, a .JAR file, or a .ZIP file, for instance. At least some of the following metadata attributes can be determined in a management tree 140 for a deployment component and also in a delivery package from the DM server 220 comprising one or more deployment components: Version, identifier, name (Displayable name for the component), type (If not part of the component content), size, and location. The deployment components may be bundled into a delivery package between the SM server 210 and the SM agent 110, optimised for delivery purposes (for instance compressing or DRM (Digital Rights Management)). The SM system keeps a record of deployment components and their status, in the present embodiment by the management tree 140. The service management SM commands from the SM server 210 to the SM agent 110 are thus addressed to one or more deployment components.

In one embodiment at least one node is stored in the management tree 140 for a deployment component. These deployment component nodes may be modified using SM commands which may be defined (by the SM agent 110 or the DM agent 120) on the basis of received DM level commands. As already above mentioned, the service management agent 110 may be configured to maintain information on deployment components in the management tree 140.

According to an embodiment, the deployment component is associated in the management tree 140 with a state describing the current status of the deployment component. Thus the state information can be easily obtained for a deployment component from the same management tree 140. In a further embodiment, the management tree 140 comprises a node for at least some of the possible states such that the deployment component is stored under a node described the current state. For instance, suitable states could be "Active", "Inactive", and "Delivered". This embodiment is illustrated in the exemplary management tree in FIG. 6, wherein deployment components may be stored under an appropriate one of state nodes. If a deployment component is associated with the state "Delivered" (in the example of FIG. 6 stored under the "Delivered" node), the deployment component has been delivered to the client device 100 but has not been installed. After installation, the component would have the state "Inactive".

Figure 6:
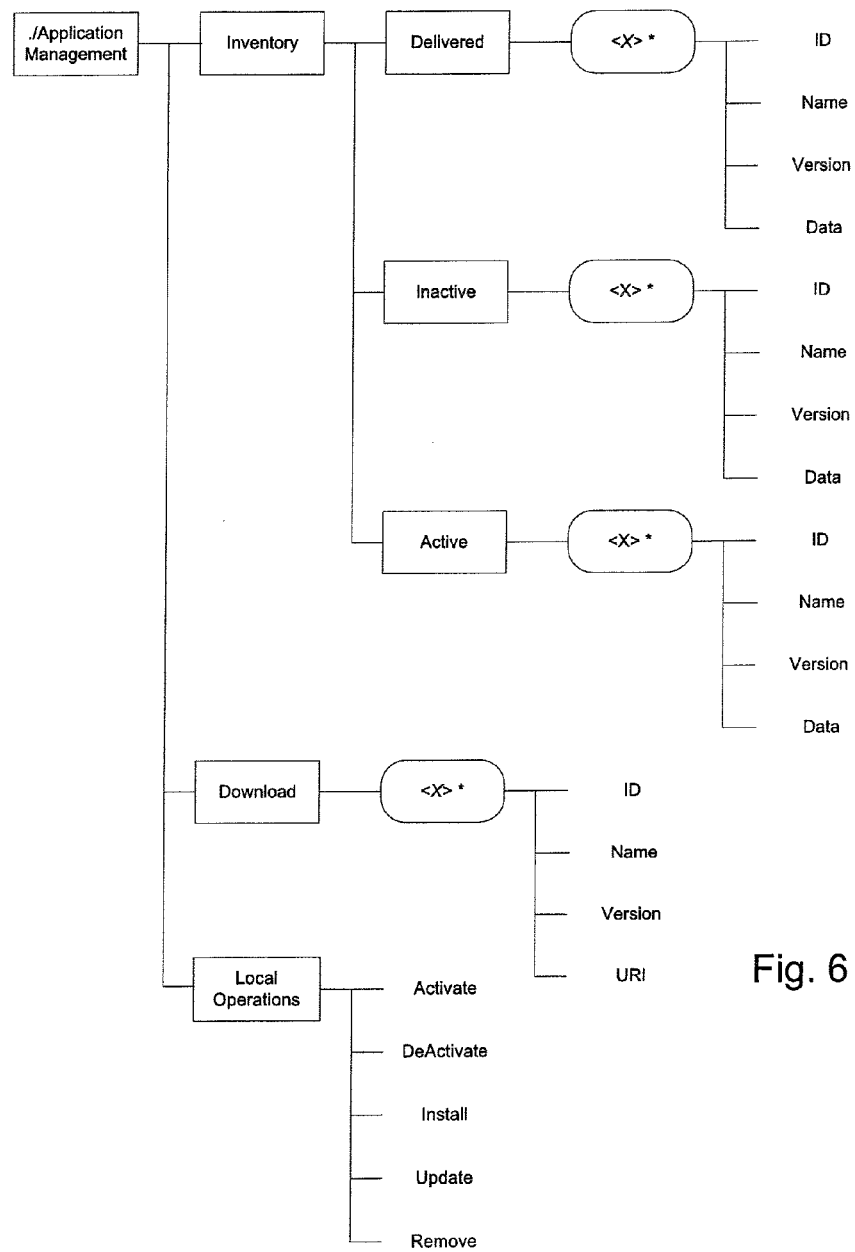
FIG. 6 illustrates a management tree configuration according to an embodiment of the invention.

Further, the service management system may provide means to make an inventory of the existing deployment components. In one embodiment the inventory is carried out by the SM agent 110 and the results of the inventory, i.e. information indicating the existing deployment components in the device 100, are returned to the DM client 120 which forwards them by DM message to the DM manager 220. The DM manager 220 forwards information on the existing deployment components to the SM manager 210. The inventory may be done by traversing through the management tree 140 searching for deployment components. In another embodiment, the management tree 140 comprises a specific inventory node for arranging the inventory of the deployment components. In one possible implementation scenario the nodes for each possible state are sub-nodes of the inventory node, as illustrated in FIG. 6. It is to be noted that the states may be implemented in other ways also, for instance under some other node than the "Inventory" node or state information may be stored in a deployment component node. For more details on a service management system in which the present features related to arranging local operations could be applied, reference is made to co-pending U.S. Publication No. 2006/0015626, the content of which is incorporated herein by reference in its entirety.

Figure 7:
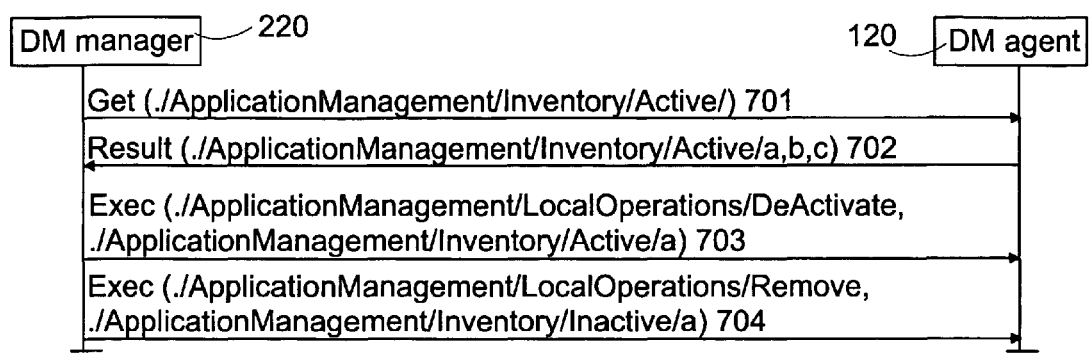
FIG. 7 is a signalling diagram illustrating a service management scenario according to an embodiment of the invention.

FIG. 7 illustrates one example relating to uninstalling of an already existing service in the client data processing device 100, reference is also made to the management tree structure of FIG. 6. By an exemplary SM level command "Make Component Inventory" the SM manager 210 requests component inventory. This SM command is mapped to a DM GET request indicating the Inventory/Active node in the management tree 140 as illustrated. The DM command GET sub-tree is carried out to this node whereby at least one of components is retrieved from the management tree 140 (either by the SM agent 110 or the DM agent 120). The device 100 sends a response to the server device 200 the message 702 comprising the list of the existing components. The SM manager 210 defines a SM level "De-Activate" command, based on which the DM level execution message 703 to the Local Operations/De-Activate node is defined and transmitted to the managed device 100. Based on this DM command, an execution command is carried out to this node in the management tree 140. In response to this execution command (or possibly a notification from the DM agent 120), an SM level deactivation command is identified. The deactivation command is carried out, on the basis of which the SM agent 110 relocates the component "a" under the "InActive" node in the "Inventory" node. Similarly, in order to carry out the SM level "Remove" command for removing the component "a", the DM level execution command 704 for Local Operations/Remove node is defined and transmitted to the managed device 100. Based on the DM execution command, the SM command for carrying out the local removal operation is defined. Thus the SM agent 110 removes the component "a" from the "Inactive" node (under which it was moved in response to the command 703) in the management tree 140. The component "a" has then been removed from device 100. For the sake of clarity, FIG. 7 shows no logical commands between the SM agent 110 and the SM manager 210, neither are responses to messages 703 and 704 shown.

In the following some service management use cases are illustrated.

Corporate IM (IT Management) installs a new business application.
Corporate IM updates an existing business application.
Corporate IM analyzes a virus definition file in a manageable device.
Service provider updates an existing plug-in for a browser.
Service provider updates a messaging application UI (User Interface).
Service provider controls game service: According to the terms of a service agreement, the service provider deactivates a service and the service is activated only after the user pays the invoice.
Corporate IM reinstalls a faulty application.
Service provider installs a new codec for a media player.

It is to be noted that instead of the above illustrated corporate IM and service provider entities other kinds of administrative entities may be in control of the management server device 200 and manage the client device 100 by the present SM and/or DM features. For instance, network operators or manufacturers could also be such administrative entities.

There may be multiple different management methods available for the device (200) functioning as the service management server. This means that the management server device (200) may select an appropriate management method for delivering a managed asset such as a deployment component to the client device (100), i.e. for carrying out a management task to the first device. This selection may be done on the basis of the properties of the managed asset to be delivered, on the basis of the properties of the manageable device and/or some other decision criterion.

According to an embodiment, at least two different management channels are applied. The term "channel" herein generally refers to a particular delivery method for arranging delivery of a management command and/or asset to a managed device.

In one embodiment a first managed asset is delivered to the managed device (100) by direct delivery, i.e. by transmitting the command by a (DM or SM) management protocol from the managing device (200). Another alternative (for a second managed asset) is to apply indirect delivery, whereby only a direct or indirect reference to the asset is first delivered to the managed device. This reference may be transmitted by a management protocol. The managed device may then retrieve the asset, for instance an automatically installing software update package, on the basis of the reference. The reference may be a URI to the location from which the managed asset is to be retrieved. Selection of a management method may be determined as described herein, and/or as described in U.S. Publication. No. 2006/0031449, the content of which is incorporated herein by reference in its entirety.

In a further embodiment, referring again to FIG. 6, the management tree 140 is provided with a "Download" node for storing references to the managed assets. In FIG. 6 one exemplary entry including an identifier, a name, a version and a URI for such referred managed asset is illustrated. The agent (110 or 120) may retrieve the reference from this node in response to an external or internal trigger, for instance an input from the user or an installation command from the managing device (200). The downloading of the managed asset may be activated in the embodiment of FIG. 6 by sending an execution command for an entry of the managed asset in the "Download" node. The asset can then be retrieved from the URI and possibly stored in the "Delivered" node. After this already illustrated further features may be applied for the managed asset, for instance the "Install" command may be executed. It is to be noted that the information in the entry, i.e. sub-node of the "Download" node is only an example. For instance, if the URI or some other type of identifier identifying the location of the managed asset does not indicate the appropriate retrieval method for retrieving the object, a specific "Type" information attribute indicating the retrieval method such as "HTTP" could be stored in an entry for a referred managed asset. This feature may be applied for service management and/or device management.

It should be noted that the embodiments described above could also be applied in any combination thereof. It is apparent to a person skilled in the art that as technology advances, the basic idea of the invention can be implemented in many different ways. The invention and its embodiments are thus not restricted to the examples described above, but can vary within the scope of the claims. For instance, the present method for arranging local operations may also be applied for remote file system management.

The invention claimed is:

1. A data processing device, comprising:
   a memory for storing at least one management structure comprising or representing manageable objects and including computer program code, and
   at least one processor, configured, with the memory and the computer program code, to cause the data processing device at least to
   define at least one required local operation to a second node of a management structure of a device being managed on the basis of a device management command or service management command received from a managing device by a device management protocol or service management protocol and addressed to a first node of the management structure, and
   carry out the defined local operation to the second node of the management structure.

2. The data processing device according to claim 1, wherein the received device management command comprises a uniform resource identifier to the first node and a uniform resource identifier to the second node, and
   the data processing device is configured to carry out the local operation to the second node on the basis of the uniform resource identifier of the second node.

3. The data processing device according to claim 1, wherein the first node is a local operations node associated with at least one local operation, and
   in response to an execution command to the local operations node, the data processing device is configured to carry out the associated local operation for at least one managed object.

4. The data processing device according to claim 3, wherein a sub-node is stored for each local operation, and in response to an execution command to such sub-node, the data processing device is configured to carry out an operation associated with the operation sub-node.

5. The data processing device according to claim 1, further comprising a service management agent for executing service management commands from a service management manager, and further comprising a device management client for executing device management commands from a managing device.

6. The data processing device according to claim 5, wherein the received management command is a device management command and carried out by the device management client to the first node,
   the service management agent is configured to identify and/or define the required local operation in response to the execution of the device management command to the first node, and the service management agent is configured to carry out the required local operation for the second node.

7. The data processing device according to claim 6, wherein the received management command comprises a uniform resource identifier to the second node as a parameter of the management command to the first node,
the device management client is configured, on the basis of the received management command, to submit, to the first node, an execution command comprising the uniform resource identifier to the second node, and
the service management agent is configured to carry out the required local operation for the second node on the basis of the uniform resource identifier of the second node in the execution command.

8. The data processing device according to claim 6, wherein
the service management agent is configured to define at least one local device management command for carrying out the defined local operation,
the service management agent is configured to request or order the device management agent to carry out the at least one local device management command and the device management client is configured to carry out the at least one local device management command, or
the service management agent is configured to carry out the at least one local device management command.

9. The data processing device according to claim 5, wherein the device management client is open mobile alliance device management compliant for carrying out open mobile alliance commands from a device management manager.

10. The data processing device according to claim 5, wherein the management structure comprises a service management level deployment component for which the data processing device is configured to initiate the local operation.

11. An apparatus according to claim 1, wherein the apparatus is a mobile communications terminal device.

12. A data processing device, comprising:
a memory including computer program code,
at least one processor configured to, with the memory and the computer program code, cause the data processing device at least to define management commands for a managed device including defining at least one device management command or service management command addressed to a first node of a management structure of the managed device such that it comprises a command for arranging a local operation for a second node of the management structure of the managed device or at least an indication of the second node to which the local operation is to be carried out in the managed device, and
a transceiver for transmitting the management command from a managing device by a device management protocol or service management protocol to the managed device.

13. A data processing device according to claim 12, wherein the data processing device comprises a service management manager for issuing service management commands to the managed device and a device management manager configured to transmit device management commands to the managed device.

14. A data processing device according to claim 13, wherein the data processing device is configured to define the device management command on the basis of a service management command or primitive for performing the local operation in the managed device, and the device management manager is configured to transmit the defined device management command for performing the local operation to the managed device.

15. A data processing device according to claim 12, wherein the data processing device is configured to specify a uniform resource identifier of the second node to the management command besides a uniform resource identifier of the first node.

16. A data processing device according to claim 12, wherein the first node is a local operations node associated with at least one local operation, and
the data processing device is configured to define in the management command an execution command to the first node in response to a need to perform the local operation to the second node.

17. A method comprising:
defining a device management command or service management command addressed to a first node of a management structure of a managed device such that it comprises a command for performing a local operation for a second node of the management structure of the managed device or at least an indication of the second node to which the local operation is to be carried out in the managed device, and
transmitting the management command by a device management protocol or service management protocol from a managing device to the managed device.

18. A method according to claim 17, further including issuing service management commands by a service management manager to the managed device and transmitting device management commands by a device management manager to the managed device.

19. A method according to claim 17, further including defining a device management command on the basis of a service management command or primitive for performing the local operation in the managed device, and
wherein the device management manager transmits the defined device management command for performing the local operation to the managed device.

20. A method according to claim 17, further including specifying a uniform resource identifier of the second node to the management command besides a uniform resource identifier of the first node.

21. A method according to claim 17, wherein the first node is a local operations node associated with at least one local operation, and
further including defining in the management command an execution command to the first node in response to a need to perform the local operation to the second node.

22. A non-transitory data storage medium for storing a computer program downloadable into the memory of a data processing device for a management system, the computer program comprising a computer program code for, when executed in the processor of the data processing device, causing the data processing device to:
define at least one required local operation to a second node in a management structure of a device being managed comprising or representing manageable objects on the basis of a device management command or service management command received from a managing device by a device management protocol or service management protocol and addressed to a first node of the management structure, and
carry out the defined local operation to the second node of the management structure.

23. A non-transitory data storage medium according to claim 22, wherein the first node is a local operations node associated with at least one local operation, and the data processing device is further caused to carry out the associated local operation for at least one managed object in response to an execution command to the local operations node.

24. A non-transitory data storage medium for storing a computer program product downloadable into the memory of a data processing device for a management system, the computer program comprising a computer program code for, when executed in the processor of the data processing device, causing the data processing device to:

define at least one device management command or service management command addressed to a first node of a management structure of a managed device and transmittable by a device management protocol or service management protocol such that it comprises a command for arranging a local operation for a second node of the management structure of the managed device or at least an indication of the second node to which the local operation is to be carried out in the managed device, and transmit the at least one device management command or service management command from a managing device to the managed device.

25. A non-transitory data storage medium as claimed in claim 24, wherein the first node is a local operations node associated with at least one local operation, and the data processing device is further caused to define in the management command an execution command to the first node in response to a need to perform the local operation to the second node.

26. A method comprising:

receiving by a managed device, from a managing device, by a device management protocol or service management protocol a device management command or service management command addressed to a first node of a management structure of the managed device and comprising a command for performing a local operation for a second node of the management structure of the managed device or at least an indication of the second node to which the local operation is to be carried out in the managed device, defining at least one required local operation to the second node in the management structure on the basis of the received management command to the first node of the management structure, and initiating the defined local operation to the second node in the management structure.

27. The method according to claim 26, wherein the received management command comprises a uniform resource identifier to the first node and a uniform resource identifier to the second node, and further including carrying out the local operation to the second node on the basis of the uniform resource identifier of the second node.

28. The method according to claim 26, wherein the first node is a local operations node associated with at least one local operation, and in response to an execution command to the local operations node, carrying out the associated local operation for at least one managed object.

29. The method according to claim 28, wherein a sub-node is stored for each local operation, and in response to an execution command to such sub-node, carrying out an operation associated with the operation sub-node.

30. The method according to claim 26, further including executing service management commands from a service management manager by a service management agent, and executing device management commands by a device management client.

31. The method according to claim 30, wherein the received management command is the device management command which is carried out by the device management client to the first node, the service management agent identifies and/or defines the required local operation in response to the execution of the device management command to the first node, and the service management agent carries out the required local operation for the second node.

32. The method according to claim 31, wherein the received management command comprises a uniform resource identifier to the second node as a parameter of the management command to the first node, the device management client, on the basis of the received management command, submits, to the first node, an execution command comprising the uniform resource identifier to the second node, and the service management agent carries out the required local operation for the second node on the basis of the uniform resource identifier of the second node in the execution command.

33. The method according to claim 31, wherein the service management agent defines at least one local device management command for carrying out the defined local operation, the service management agent requests or orders the device management client to carry out the at least one local device management command and the device management client carries out the at least one local device management command, or the service management agent carries out the at least one local device management command.

34. The method according to claim 30, wherein the management structure comprises a service management level deployment component for which the local operation is initiated.

35. An apparatus comprising:

a memory for storing at least one management structure comprising or representing manageable objects and including computer program code, and at least one processor configured to, with the memory and the computer program code, cause the apparatus at least to define at least one required local operation to a second node of a management structure of a managed device on the basis of a device management command or service management command received from a managing device by a device management protocol or service management protocol and addressed to a first node of the management structure, and to carry out the defined local operation to the second node in the management structure.

36. An apparatus according to claim 35, wherein the apparatus is a chipset.

* * * * *